(12) United States Patent
Nijs et al.

(10) Patent No.: US 10,885,882 B2
(45) Date of Patent: Jan. 5, 2021

(54) REDUCING ALIASING ARTIFACTS IN FOVEATED RENDERING USING CROSS-RESOLUTION MODULATION

(71) Applicant: Tobii AB, Danderyd (SE)

(72) Inventors: Daan Pieter Nijs, Enskede (SE); Fredrik Lindh, Täby (SE)

(73) Assignee: Tobii AB, Danderyd (SE)

( * ) Notice: Subject to any disclaimer, the term of this patent is extended or adjusted under 35 U.S.C. 154(b) by 67 days.

(21) Appl. No.: 16/211,917

(22) Filed: Dec. 6, 2018

(65) Prior Publication Data

US 2020/0184933 A1 Jun. 11, 2020

(51) Int. Cl.
*G09G 5/391* (2006.01)
*G06F 3/01* (2006.01)

(52) U.S. Cl.
CPC ............. *G09G 5/391* (2013.01); *G06F 3/013* (2013.01); *G09G 2340/0407* (2013.01); *G09G 2354/00* (2013.01)

(58) Field of Classification Search
CPC .................... G06F 3/013; G09G 5/391; G09G 2340/0407; G09G 2354/00
See application file for complete search history.

(56) References Cited

U.S. PATENT DOCUMENTS

| | | | |
|---|---|---|---|
| 7,572,008 B2 | 8/2009 | Elvesjo et al. | |
| 2011/0097011 A1* | 4/2011 | Lim | G06T 11/60 382/264 |
| 2012/0321184 A1* | 12/2012 | Ouzilevski | G06T 5/20 382/167 |
| 2017/0011492 A1* | 1/2017 | Thunstrom | G06F 3/013 |
| 2017/0169602 A1* | 6/2017 | Blackmon | G06T 15/005 |
| 2017/0235362 A1* | 8/2017 | Thunstrom | G09G 5/37 345/428 |
| 2017/0263046 A1* | 9/2017 | Patney | G06F 3/013 |
| 2018/0096471 A1* | 4/2018 | Wilson | G02B 27/0172 |
| 2018/0107271 A1* | 4/2018 | Woo | G06F 3/013 |
| 2018/0357749 A1* | 12/2018 | Young | G06T 3/40 |
| 2019/0113970 A1* | 4/2019 | Nijs | G09G 5/37 |
| 2019/0273910 A1* | 9/2019 | Malaika | H04N 13/332 |

* cited by examiner

*Primary Examiner* — Amare Mengistu
*Assistant Examiner* — Jennifer L Zubajlo
(74) *Attorney, Agent, or Firm* — Samuel Yamron

(57) ABSTRACT

According to the invention, a method for reducing aliasing artifacts in foveated rendering is disclosed. The method may include accessing a high resolution image and a low resolution image corresponding to the high resolution image, and calculating a difference between a pixel of the high resolution image and a sample associated with the low resolution image. The sample of the low resolution image corresponds to the pixel of the high resolution image. The method may further include modifying the pixel to generate a modified pixel of the high resolution image based on determining that the difference is higher than or equal to a threshold value. The modification may be made such that an updated difference between the modified pixel and the sample is smaller than the original difference.

19 Claims, 6 Drawing Sheets

REDUCING ALIASING ARTIFACTS IN FOVEATED RENDERING USING CROSS-RESOLUTION MODULATION

BACKGROUND OF THE INVENTION

Rendering and displaying a computer-generated scene on a display has increased in importance in areas such as gaming, modeling, and movies. Rendering is a computationally expensive process in which the entire scene's spatial, textural, and lighting information are combined to determine the color value of each pixel in the rendered image. Graphics processing devices performing the rendering, however, have limited processing power and memory capacity. These limits make the rendering of the scene, especially real-time rendering, a challenging task.

To speed up the rendering process, foveated rendering is sometimes employed. Foveated rendering uses an eye tracker to reduce the rendering workload based on the observation that human vision typically focuses on the portion of the screen near the gaze point whereas the visual acuity drops dramatically in the peripheral vision (i.e. the area outside of the zone gazed by the fovea). In foveated rendering, the content in an area near the gaze point of a user, also referred to herein as "foveated region," is rendered with high quality, whereas the content outside the foveated region, referred to as "non-foveated region," is rendered with lower quality. As the user's gaze point moves, the images are re-rendered accordingly to match the new location of the gaze point.

In some cases, foveated rendering can be implemented by supersampling the foveated region while subsampling the non-foveated region. However, the discrepant sampling rates lead to rendering inconsistencies for high-frequency content, manifesting itself as a highly distracting effect of rapidly transitioning or "popping" in/out of high luminance during saccades, also called gaze-dependent temporal aliasing artifacts. Existing anti-aliasing methods are incapable of reducing this type of aliasing artifact because these methods focus on addressing spatial aliasing artifacts in one image, rather than the temporal aliasing artifacts that occur among consecutive images.

BRIEF DESCRIPTION OF THE INVENTION

In some embodiments, a method for reducing aliasing artifacts in foveated rendering is provided. The method may include accessing a high resolution image and a low resolution image corresponding to the high resolution image, and calculating a difference between a pixel of the high resolution image and a sample associated with the low resolution image. The sample of the low resolution image corresponds to the pixel of the high resolution image. The method may further include modifying the pixel to generate a modified pixel of the high resolution image based on determining that the difference is higher than or equal to a threshold value. The modification may be made such that an updated difference between the modified pixel and the sample is smaller than the original difference.

In another embodiment, a computing system for reducing aliasing artifacts in foveated rendering is provided. The computing system may include a non-transitory computer-readable medium storing program code of an image processing application, and a processing device communicatively coupled to the non-transitory computer-readable medium. The processing device may be configured to execute the program code and perform operations that include accessing a high resolution image and a low resolution image that corresponds to the high resolution image. The operations may further include calculating a difference between a pixel of the high resolution image and a sample associated with the low resolution image. The sample associated with the low resolution image corresponds to the pixel of the high resolution image. The operations may further include modifying the pixel of the high resolution image to generate a modified pixel of the high resolution image when determining that the difference is higher than or equal to a threshold value. The difference between the modified pixel and the sample is smaller than the previous difference.

In another embodiment, a non-transitory machine readable medium having instructions thereon for reducing aliasing artifacts in foveated rendering is provided. The instructions may be executable by one or more processors to perform operations that may include accessing a high resolution image and a low resolution image that corresponds to the high resolution image. The operations may further include calculating a difference between a pixel of the high resolution image and a sample associated with the low resolution image. The sample associated with the low resolution image corresponds to the pixel of the high resolution image. The operations may further include modifying the pixel of the high resolution image to generate a modified pixel of the high resolution image when determining that the difference is higher than or equal to a threshold value. The difference between the modified pixel and the sample is smaller than the previous difference.

BRIEF DESCRIPTION OF THE DRAWINGS

The present invention is described in conjunction with the appended figures.

Figure 1:
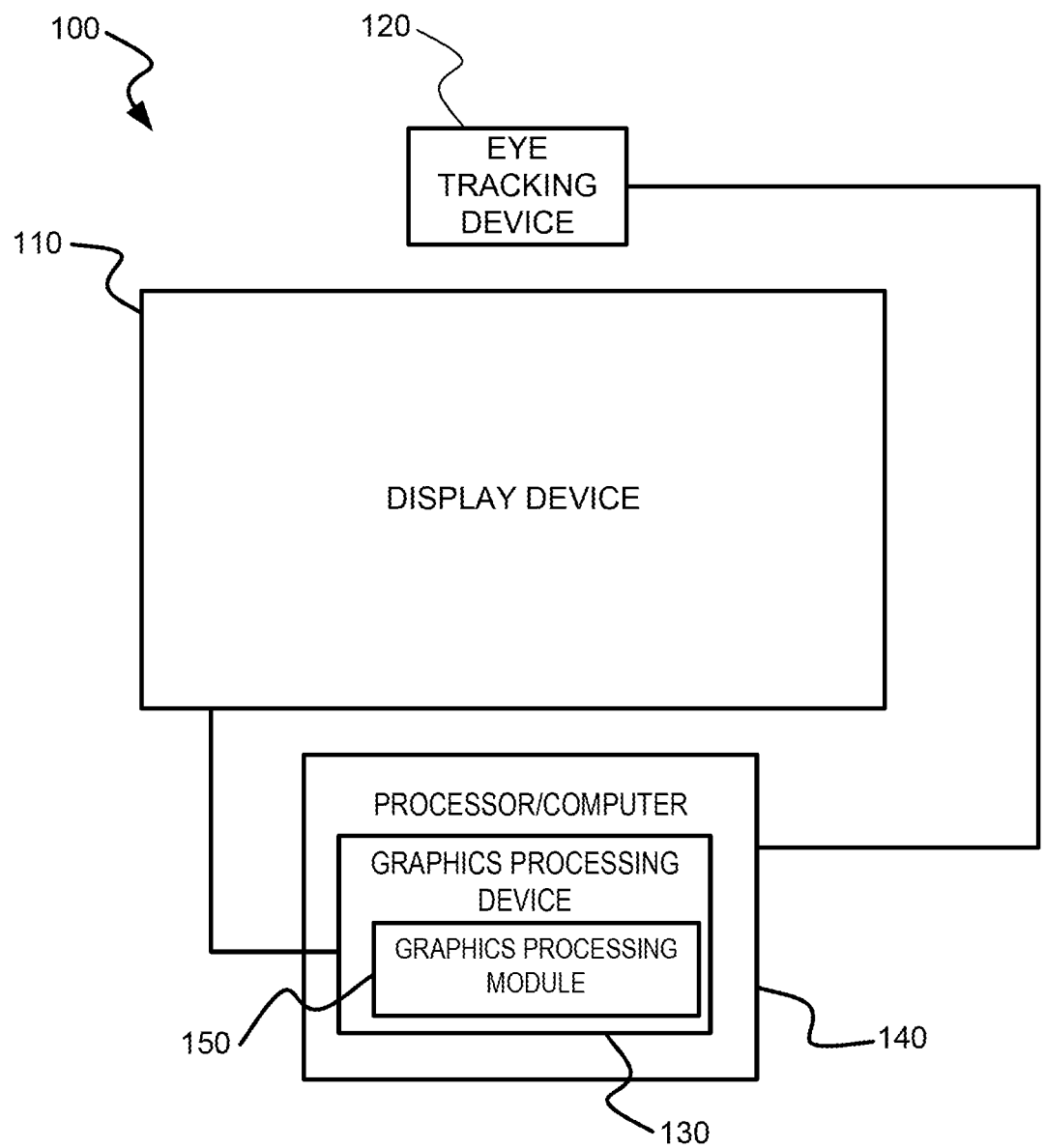
FIG. 1 is a block diagram of one possible system of the invention for reducing temporal aliasing artifacts in foveated rendering, according to an embodiment of the present disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Embodiments for reducing temporal aliasing artifacts in foveated rendering are disclosed. In an example, a graphics processing device implements the foveated rendering by generating a high resolution foreground image for a foveated region containing the gaze point of a user on a display device, and a background image having a lower resolution for the non-foveated region. The background image also contains an area that corresponds to the high resolution image, which is referred to herein as a "low resolution image". The graphics processing device evaluates a pixel in the high resolution image and determines a sample in the low resolution image that corresponds to the pixel in the high resolution image by mapping the coordinates of the pixel in the high resolution image to the low resolution image. The sample might be a pixel of the low resolution image if the pixel of the high resolution image is mapped to a pixel of the low resolution image. If the pixel of the high resolution image is mapped to a position that falls between pixels of the low resolution image, the sample can be generated by interpolating pixels of the low resolution image. The graphics processing device further compute the difference between the pixel and the sample, and compare the difference with a threshold value. If the difference is higher than the threshold value, the pixel in the high resolution image is modified to reduce the difference between the pixel and the sample. As a result, samples in the low resolution image are utilized to modulate the values of the pixels in the high resolution image in a way that keeps contrast consistent across both resolutions.

The technologies presented herein improves the performance of the graphics processing device by reducing the temporal aliasing artifacts in foveated rendering while allowing the graphics processing device to reduce the computing resource consumptions through foveated rendering. In other words, without the anti-aliasing technologies presented herein, the graphics processing device may need to increase the quality of the rendered image in the non-foveated region or perform other computationally expensive operations in order to mitigate the temporal aliasing artifacts. As a result, the technologies presented herein reduce the overall computational resource consumption of the system, including, but not limited to, CPU and/or GPU times, memory space, or network bandwidth.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It is understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function. Any detail present in one discussed embodiment may or may not be present in other versions of that embodiment or other embodiments discussed herein.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments of the invention, and with reference to FIG. 1, a system 100 for presenting graphics or images on a display device 110 is provided. The system 100 may include an eye tracking device 120 and a graphics processing device 130. In some embodiments, the system may also include a computing device 140 which communicates with, and controls, a graphics processing device 130. In some embodiments, any function of the graphics processing device 130 may be performed, in whole or in part, by computing device 140. Merely by way of example, the eye tracking device 120 may be provided integral to, or in addition to, a personal computer 140 having a graphics processing device 130 and a central processing unit (in some configurations, the graphics processing device 130 and the central processing unit are integrated).

In other embodiments, the eye tracking device 120 may be provided integral to, or in addition to, a gaming console 140 or other device having a graphics processing device 130 and a central processing unit. Examples of gaming consoles include those produced and available from Microsoft™, Nintendo™, or Sony™. In other embodiments, the eye tracking device 120 may be provided integral to, or in addition to, a wearable headset such as a Virtual Reality (VR) or Augmented Reality (AR) or the like. Examples of wearable headsets include those produced and available under the names Oculus Rift™, HTC Vive™, Sony PlaystationVR™ and Fove™ Thus, embodiments of the invention may be applied to the presentation of graphics in any number of possible devices and applications, including a video display, video games, video production and editing, video communications, computer-aided drafting, and design, etc.

The eye tracking device 120 may be for determining at least one of a gaze point of a user on a display device 110, or a change in the gaze point of the user on display device 110. Eye tracking devices and methods, sometimes referred to as gaze detection systems and methods include, for example, products produced and available from Tobii AB, and which operate by using infrared illumination and an image sensor to detect reflection from the eye of a user. An example of such a gaze detection system is described in U.S. Pat. No. 7,572,008, which is hereby incorporated by reference, for all purposes, as if fully set forth herein. Other alternative gaze detection systems may also be employed by the invention, regardless of the technology behind the gaze detection system. The eye tracking device 120 may employ its own processor or the processor of another device (i.e., computing device 140) to interpret and process data received. When an eye tracking device is referred to herein, both possible methods of processing data are referred to.

In some embodiments, the graphics processing device 130 renders the computer-generated scene, such as three-dimensional (3D) scene, into images and send the rendered images to the display device 110 for display. The graphics processing device 130 can employ foveated rendering based at least in part on the gaze point of the user on display device 110, or a change in the gaze point of the user on display device 110, as determined by eye tracking device 120. The graphics processing device 130 may further include a graphics processing module 150 for processing the rendered images, such as combining high resolution and low resolution background images in foveated rendering or perform other post-processing operations on the rendered image. In some embodiments, the graphics processing module 150 also performs the anti-aliasing mechanism presented herein before the rendered image is sent to the display device 110. While in some embodiments a separate non-included or non-integrated display device will be controlled by the graphics processing device 130, other embodiments may include or integrate display device 110.

Figure 2A:
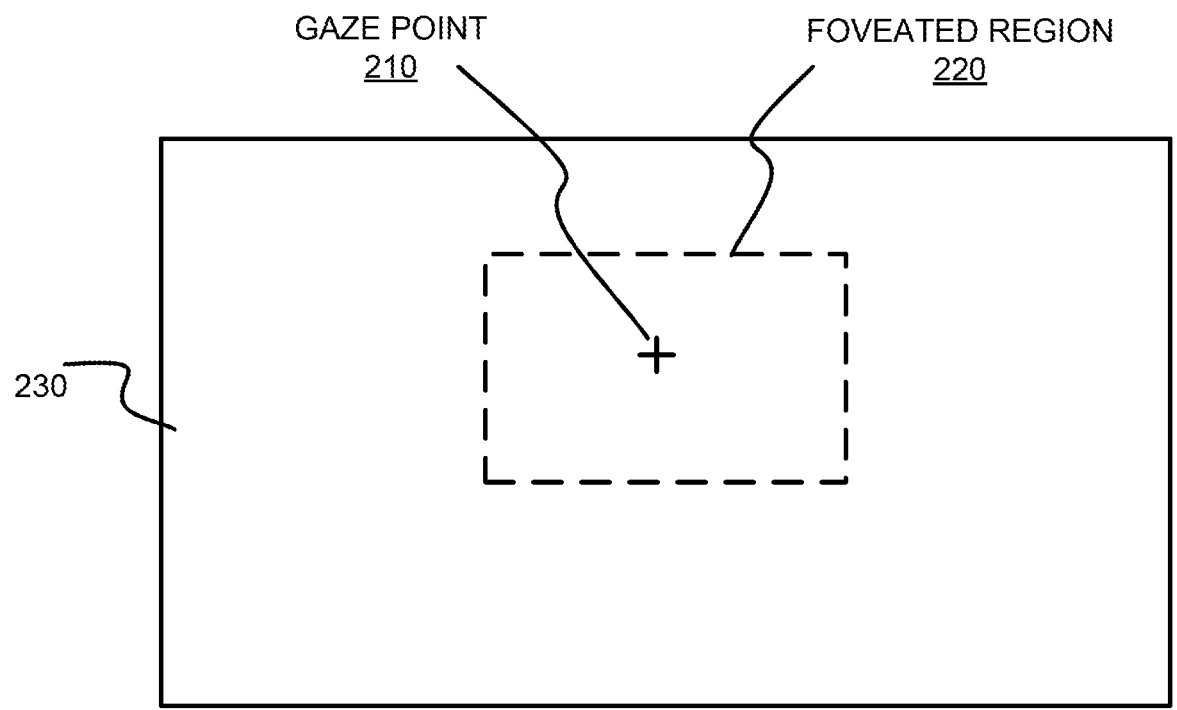
FIG. 2A depicts an example of a view of a display device in which an image generated using foveated rendering is displayed.

The way in which the graphics processing device 130 implements the foveated rendering may vary depending on the embodiments. FIG. 2A illustrates one embodiment of the foveated rendering, which shows a display device 110, a user's gaze point 210 on the display device 110 and the foveated region 220 around user's gaze point 210 in which the graphics processing device 130 may display an image having a quality higher than the remaining area 230 of the display device 110, also referred to as "non-foveated region 230". In one embodiment, the graphics processing device 130 renders the image for the foveated region 220 with a high sampling rate while rendering the image for the non-foveated region 230 with a low sampling rate. As a result, the image for the non-foveated region 230 can be generated with a low resolution, and the image for the foveated region 220 can be generated with a high resolution. In this manner, available resources of the graphics processing device 130, and/or other system resources, can be utilized efficiently without scarifying the overall visual quality of the displayed image.

It should be appreciated that while the foveated region 220 illustrated in FIG. 2A is has a rectangular shape, the foveated region 220 can have any regular or irregular shapes, such as circular, oval, square, rectangular, or polygonal, and so on. Further, in addition to using different sampling rates for the foveated region 220 and the non-foveated region 230, the quality of these two regions can be made different in other aspects, such as shading, texture mapping, bump mapping, shadows, reflection, frame rate, post processing effects quality, refraction quality, three-dimensional object quality, and so on. The various embodiments described herein use the different sampling rate as an example to illustrate the mechanism proposed herein for reducing temporal aliasing artifacts. The mechanism can be utilized similarly to reduce the artifacts caused by other types of quality discrepancy.

Figure 2B:
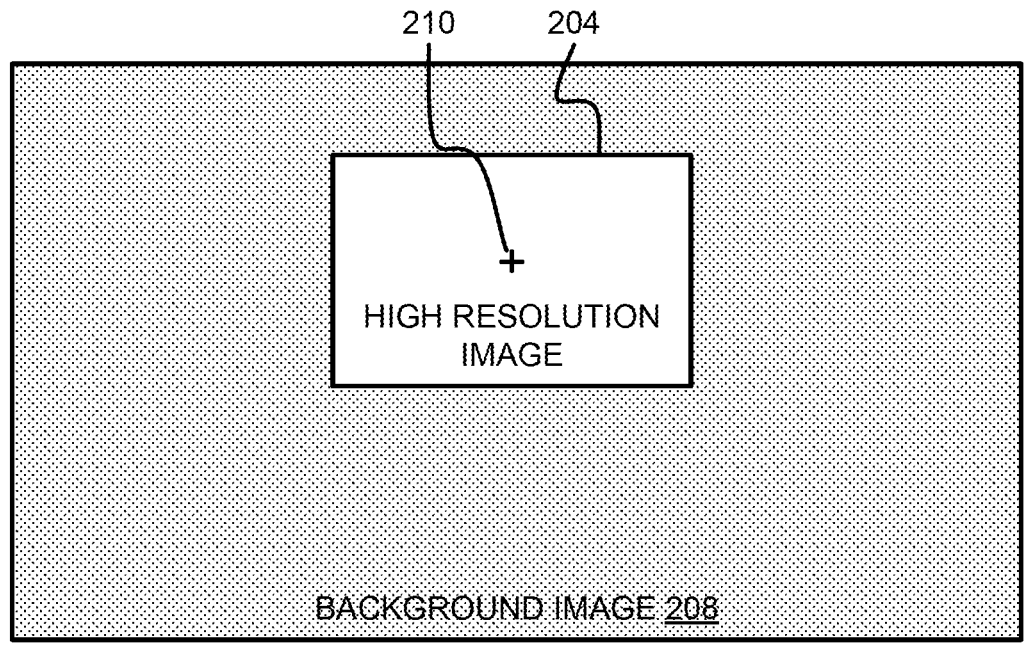
FIG. 2B is a diagram illustrating an example of foveated rendering, according to an embodiment of the present disclosure.

FIG. 2B illustrates an example of foveated rendering using different sampling rates for foveated region 220 and non-foveated region 230, according to an embodiment of the present disclosure. In this example, the foveated rendering involves generating a background image 208 with a low resolution and a high resolution foreground image 204, also referred to as a high resolution image 204. For instance, the background image 202 can be generated using a sampling rate that is half of the sampling rate of an image generated for the display device without foveated rendering, referred to herein as "full image". As a result, the background image 202 has a dimension that is half of the full image in both horizontal and vertical directions. The high resolution foreground image 204 can have a same or similar sampling rate as the full image, but smaller dimensions than the full image or the display region of the display device 110.

In an example, the background image 208 corresponds to the entire content of the full image or the entire display region. In comparison, the high resolution foreground image 204 corresponds to a foveated region 220. The foveated rendering further includes combining the background image 202 and the high resolution foreground image 204 to generate a composite image 206. The combination includes overlaying the high resolution foreground image 204 on top of the background image 208 depending on the location of the gaze point 210 and the foveated region 220. The composite image 206 is presented in the image display region of the display. Accordingly, rather than presenting the full image, the composite image 206 is presented, where only the foreground image 204 is presented at a high resolution and the remaining portion of the composite image is presented at a low resolution. Additional operations might be performed during the combining process, such as blending the image content near the border of high resolution foreground image 204 to smooth out the transition between the low and high resolutions.

When combing the background image 208 with the high resolution image 204, a portion of the background image 208 overlaps with the high resolution image 204 and thus is replaced by the high resolution image 204 in the composite image 206. This portion of the background image 202 is referred to as a low resolution image and it corresponds to the high resolution image 204. As the user changes the gaze point, a new high resolution image 204 can be generated so that the image content in the new foveated region 220 can be presented in high quality. Similarly, a new background image 208 might also need to be generated if the gaze point 210 change is accompanied by a change in the user's position relative to the scene. Generally, the background image 208 is relatively stable and the changes are less significant than the high resolution image 204.

Figure 3:
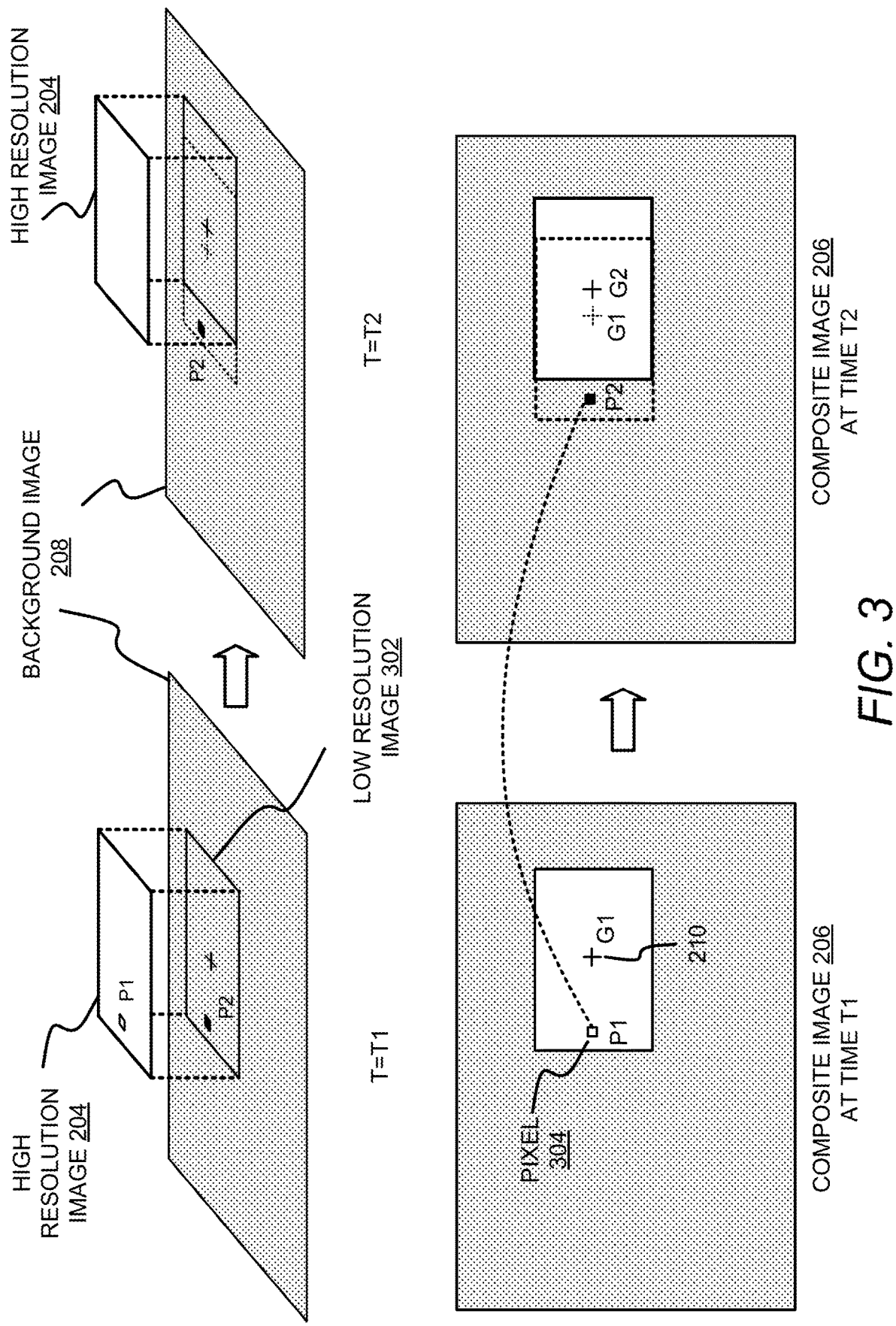
FIG. 3 is a diagram illustrating an example of the gaze-dependent temporal aliasing artifact in foveated rendering.

FIG. 3 is a diagram illustrating an example of the gaze-dependent temporal aliasing artifact in foveated rendering. FIG. 3 illustrates the foveated rendering at two consecutive time points: T1 and T2. At time T1, a high resolution image 204 covering the foveated region of a user is combined with the background image 208 by superimposing the high resolution image 204 onto the background image 208. As discussed above, a portion of the background image 208 overlaps with the high resolution image 204, which is shown in the upper left drawing of FIG. 3 and is referred to as a low resolution image 302.

FIG. 3 also shows a pixel P1 with a white color in the high resolution image 204 and a corresponding sample P2 with a black color in the low resolution image 302 at time T1. The sample P2 can be determined by remapping coordinates of the pixel P1 in the high resolution image 204 to the low resolution image 302 and interpolating the value of the sample P2 using neighboring pixels of the low resolution image 302. The pixel P1 and sample P2 are located at the same position in their respective images. As such, when combining the high resolution image 204 with the background image 208, pixel P2 is replaced with pixel P1 in the composite image 206. The lower left drawing in FIG. 3 shows the composite image 206 at time T1, where only the pixel P1 can be observed.

At time T2, the user's gaze point 210, and thus the foveated region, moves towards the left, i.e. from G1 to G2. A new high resolution image 204 is generated for this new gaze point G2 and foveated region. In this example, the gaze point change does not involve the change of the user's position relative to the 3D scene. As such, the background image 208 remains substantially unchanged. As the gaze point 210 moves to the right, sample P2 is no longer inside the foveated region. Accordingly, sample P2 is shown in the composite image 206 at time T2, to the left of the foveated region.

Comparing the composite images 206 at time T1 and T2, the pixel 304 changes from a white pixel P1 to a black pixel P2. Such a sudden change in the pixel value will cause the temporal aliasing artifacts in the displayed image as discussed before. Similarly, if the user moves his gaze point from G2 back to G1, the pixel 304 will suddenly change from a black pixel to a white pixel causing similar temporal aliasing artifacts.

To mitigate such a problem, before sending the composite image 206 for display, the graphics processing device 130 can modify the pixel P1 in the high resolution image 204 to reduce the difference between P1 and P2. One of the reasons for the temporal aliasing artifacts is the large discrepancy between the pixel values of P1 and P2. The temporal aliasing artifact is less noticeable if the difference between the pixel values P1 and P2 is small. As such, by modifying the pixel value of the pixel P1 in the high resolution image 204, the difference between P1 and P2 can be reduced and thus the aliasing artifact can also be reduced.

Figure 4:
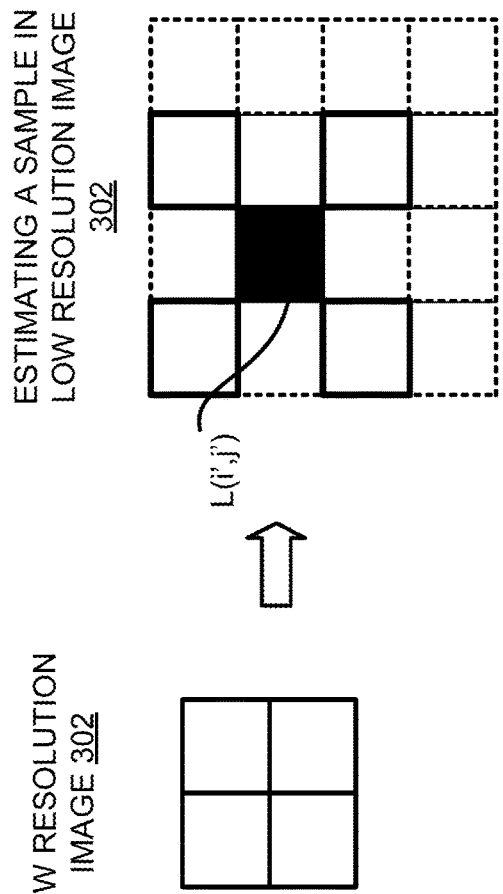
FIG. 4 is a diagram illustrating an example of a method for reducing temporal aliasing artifacts in foveated rendering, according to an embodiment of the present disclosure.
Figure 4:
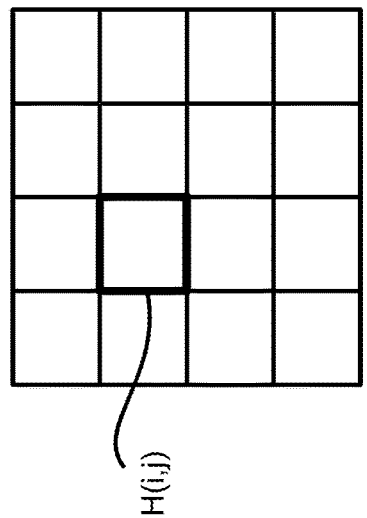
Figure 4:
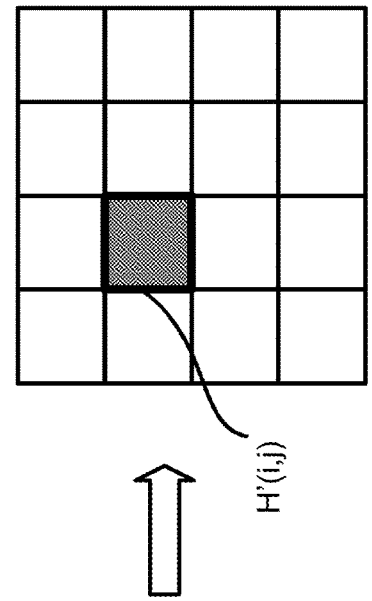

FIG. 4 is a diagram illustrating an example of a method for reducing temporal aliasing artifacts in foveated rendering, according to an embodiment of the present disclosure. For simplicity, a 2-by-2 image block is used to represent the low resolution image 302 and a 4-by-4 image block is used to represent the high resolution image 204. This over simplified example is for illustration purposes and should not be construed as limiting.

In the example shown in FIG. 4, in order to find a one-to-one correspondence between the low resolution image 302 and the high resolution image 204, the graphics processing module 150 of the graphics processing device 130 can re-map the coordinates of a given pixel in the high resolution image 204 to the coordinates in the low resolution image 302, and then estimate a sample in the low resolution image 302 that corresponds to the given pixel in the high resolution image 204 using the neighboring pixels of the low resolution image 302.

As shown in FIG. 4, a pixel of the high resolution image 204 is denoted as H(i,j). In order to find a sample in the low resolution image 302 that corresponds to the pixel H(i,j), the coordinates (i,j) of the high resolution image pixel are transformed to the coordinates (i',j') in the low resolution image. If the transformed coordinates (i',j') does not match the coordinates of existing pixels of the low resolution image 302, the graphics processing module 150 can use pixels that are close to the coordinates (i',j') to estimate the value of the sample. For example, the estimation can involve interpolating pixels adjacent to the coordinates (i',j') in the low resolution image 302 to generate a sample at (i',j'), denoted as L(i',j'). The interpolation can be performed using any linear or non-linear interpolation algorithm. Depending on the interpolation algorithm, the adjacent pixels can be in the nearest N-by-N neighborhood of the sample or along a line passing through the sample.

Once the sample L(i',j') of the low resolution image 302 is determined, the graphics processing module 150 can calculate the difference between the H(i,j) and L(i',j'), and compares the difference, such as the absolute difference |H(i,j)|, with a threshold value. In some embodiments, the difference is calculated using the luminance values of the pixels H(i,j) and L(i',j'). In those embodiments, if the high resolution image 204 and the low resolution image 302 are represented in a color space, the graphics processing module 150 converts these two images into the luminance space when calculating the difference. Likewise, the threshold is also in the luminance space. In other embodiments, the graphics processing module 150 calculates the difference between the pixel H(i,j) and the sample L(i',j') and selects the threshold value in a color space, such as an RGB color space, a YUV color space, and/or others.

If the graphics processing module 150 determines that the difference between the pixels H(i,j) and L(i',j') is greater than or equal to the threshold value, it can mean that the temporal aliasing artifact is likely to occur at the location of this pixel. The graphics processing module 150 would thus change the pixel of the H(i,j) to reduce the difference between H(i,j) and L(i',j'), such as making the difference to be smaller than the threshold value. For example, the pixel of the high resolution image 204 can be modified as follows:

$$H'(i,j)=H(i,j)-\alpha(H(i,j)-L(i',j')) \quad (1)$$

where $\alpha$ is a parameter utilized to determine the amount of the adjustment or modification made to H(i,j) and it takes a value between 0 and 1. In one embodiment, the H(i,j) is modified to take the value of the L(i',j'), i.e. $\alpha=1$. If the graphics processing module 150 determines that the difference between H(i,j) and L(i',j') is below the threshold value, the graphics processing module 150 will keep the value of the H(i,j) unchanged.

The threshold value can be selected based on factors such as the type of the display device, the graphics processing device 130, and the type of images. For example, the value of the threshold can be selected through experiments conducting using similar devices for similar image content. In one embodiment, the threshold value can be set to be 6.25% of the maximum pixel change. For example, if the pixels are represented using 8 bits and the difference is calculated in luminance value, the threshold value can be set to be 6.25%×255.

The graphics processing module 150 can apply the method described above to each pixel of the high resolution image 204 and generate a modified high resolution image 402. The graphics processing module 150 can then combine the modified high resolution image 402 with the background image 208 to generate the composite image 206, and transmit the composite image 206 to the display device 110 for display.

It should be understood that while in the above description, the aliasing removal method is performed after the low resolution image 302 and the high resolution image 204 have been rendered, it can be performed during the rendering of these two images. In some implementations, the low resolution image 302, or more precisely the background image 208 containing the low resolution image 302, and the high resolution image 204 are rendered in parallel. In those implementations, the graphics processing module 150 can determine whether the corresponding pixels in the low resolution image 302 and the high resolution image 204 have been rendered, although the rest of the images have yet to be rendered. If so, the graphics processing module 150 can apply the method described above to modify the pixels of the high resolution image 204 when necessary. The high resolution image rendered in this way has already taken into account the aliasing artifacts and thus can be combined with the background image 208 as usual after the rending to generate a composite image 206 for display.

Figure 5:
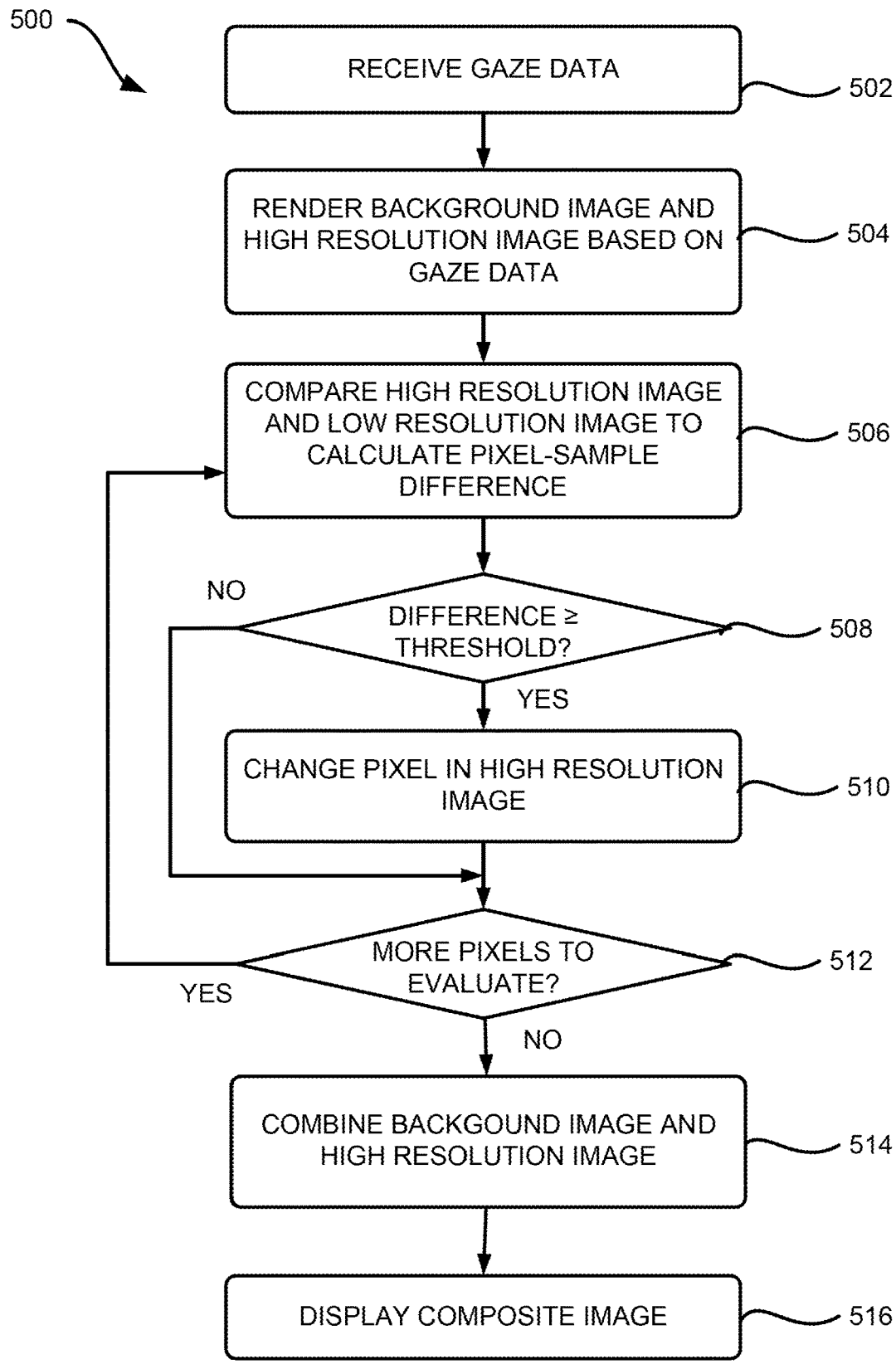
FIG. 5 is a flow diagram of one example method for reducing temporal aliasing artifacts in foveated rendering, according to an embodiment of the present disclosure.

FIG. 5 is flow diagram of one example method 500 for reducing temporal aliasing artifacts in foveated rendering, according to an embodiment of the present disclosure. One or more computing devices (e.g., the computing device 140 or more specifically the graphics processing device 130) implements operations depicted in FIG. 5 by executing suitable program code (e.g. the graphics processing module 150). For illustrative purposes, the method 500 is described with reference to certain examples depicted in the figures. Other implementations, however, are possible.

At block 502, the method 500 involves receiving gaze data, which includes the data regarding a gaze point 210 of a user on a display device 110. As discussed above, the gaze data can be generated by an eye tracking device 120 that may be separate from or integrated into the computing device 140. At block 504, the method 500 involves rendering the background image 208 including the low resolution image 302 and the high resolution image 204 based on the gaze data. The rendering can be performed by the graphics processing device 130 or another computing device that is communicatively connected to the graphics processing device 130.

At block 506, the method 500 involves comparing the high resolution image 204 and the low resolution image 302 to calculate a pixel-sample difference. As discussed above, in order to perform the comparison, the graphics processing device 130 might need to interpolate the low resolution image 302 to generate a sample that corresponds to the pixel in the high resolution image 204. The graphics processing device 130 might also need to convert both pixels into a luminance space or a color space where the difference is calculated.

At block 508, the method 500 involves comparing the difference with a threshold value. If the graphics processing device 130 determines that the difference is higher or equal to the threshold value, the method 500 involves, at block 510, modifying the pixel in the high resolution image 204 to reduce the difference value. In other words, the pixel in the high resolution image 204 is modified to be closer to the value of the sample in the low resolution image 302. In one example, the pixel is modified according to Equation (1).

At block 512, the method 500 involves determining if there are more pixels in the high resolution image 204 to be evaluated. If so, the graphics processing device 130 repeats the operations in blocks 506-510 for the next pixel. If there are no more pixels to be evaluated, the graphics processing device 130 combines, at block 514, the modified high resolution image 402 and the background image 208 to generate a composite image 206. At block 516, the method 500 involves sending the composite image 206 to the display device 110 for display. As discussed above, the graphics processing device 130 can perform the method 500 while rendering the background image 208 and the high resolution image 204. Whenever a pixel in the high resolution image 204 and the corresponding portion of the low resolution image 302 have been rendered, the method 500 can be performed for that pixel in the high resolution image and the pixel can be modified if necessary.

Figure 6:
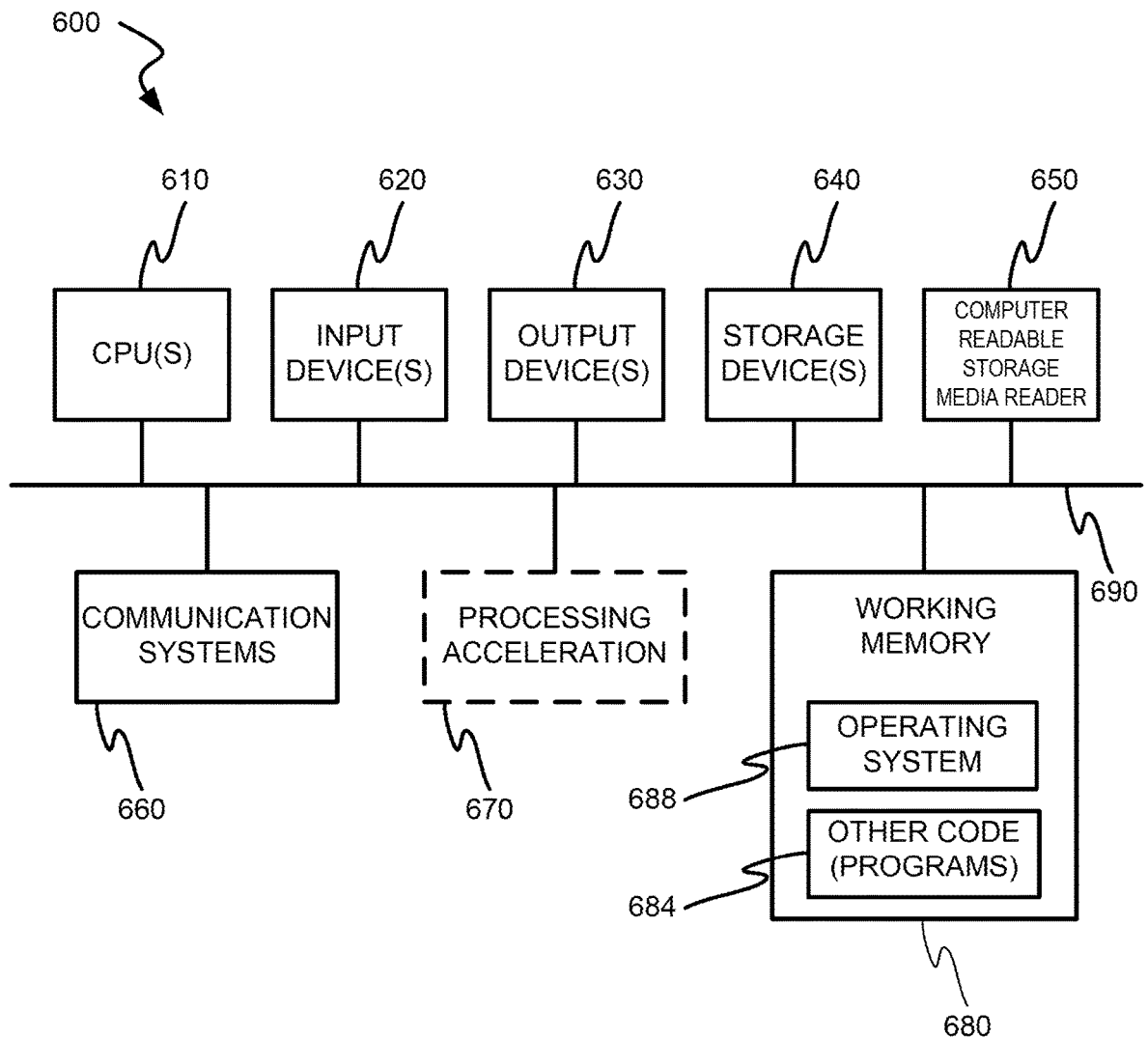
FIG. 6 is a block diagram of an exemplary computer system capable of being used in at least some portion of the devices or systems of the present invention, or implementing at least some portion of the methods of the present invention.

FIG. 6 is a block diagram illustrating an exemplary computer system 600 in which embodiments of the present invention may be implemented. This example illustrates a computer system 600 such as may be used, in whole, in part, or with various modifications, to provide the functions of the eye tracking device 120, the graphics processing device 130, the game console, the computing device 140, and/or other components of the invention such as those discussed above. For example, various functions of the eye tracking device 120 and associated processors may be controlled by the computer system 600, including, merely by way of example, tracking a user's gaze point, determining an anticipated gaze point, controlling the graphics processing device 130, etc.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage device 640. By way of example, storage device(s) 640 may be disk drives, optical storage devices, a solid-state storage device such as a random access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within a working memory 680, including an operating system 684 and/or other code 688. It should be appreciated that alternate embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 688 for implementing any or all of the function of the various elements of the architecture as described herein. For example, software, stored on and/or executed by a computer system such as system 600, can provide the functions of the eye tracking device 120, the graphics processing device 130, the game console, the processor/computer, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for reducing aliasing artifacts in foveated rendering, the method comprising:
   accessing, by a processing device, a high resolution image and a low resolution image that corresponds to the high resolution image;
   calculating, by the processing device, a first difference between a first pixel of the high resolution image and a second sample associated with the low resolution image, the second sample corresponding to the first pixel; and
   modifying, by the processing device, the first pixel to generate a modified pixel of the high resolution image based on determining that the first difference is higher than or equal to a threshold value, wherein a second difference between the modified pixel and the second sample is smaller than the first difference, wherein modifying the first pixel comprises replacing the first pixel with the second sample.

2. The method of claim 1, further comprising:
   calculating a first luminance value of the first pixel and a second luminance value of the second sample, wherein the first difference comprises a difference between the first luminance value and the second luminance value.

3. The method of claim 2, wherein modifying the first pixel comprises modifying the first luminance value of the first pixel.

4. The method of claim 1, wherein the first difference comprises a difference between a first color value of the first pixel and a second color value of the second sample.

5. The method of claim 1, further comprising:
   maintaining the first pixel and not generating the modified pixel based on determining that the first difference is lower than the threshold value.

6. The method of claim 1, wherein the second sample associated with the low resolution image is generated by interpolating two or more pixels of the low resolution image.

7. The method of claim 1, wherein the high resolution image is generated for a foveated region containing a gaze point of a user on a display device.

8. The method of claim 7, further comprising:
   causing the high resolution image containing the modified pixel to be displayed on the display device.

9. The method of claim 7, wherein the low resolution image corresponds to the foveated region containing the gaze point of the user on the display device.

10. The method of claim 9, wherein the first pixel of the high resolution image and the second sample of the low resolution image correspond to a same point in the foveated region.

11. The method of claim 9, further comprising:
    preventing the low resolution image from being displayed on the display device by causing the high resolution image be presented in the foveated region on the display device.

12. A computing system comprising:
    a non-transitory computer-readable medium storing program code of an image processing application; and
    a processing device communicatively coupled to the non-transitory computer-readable medium, wherein the processing device is configured to execute the program code and thereby perform operations comprising:
       accessing a high resolution image and a low resolution image that corresponds to the high resolution image;
       calculating a first difference between a first pixel of the high resolution image and a second sample associated with the low resolution image, the second sample corresponding to the first pixel; and
       modifying the first pixel to generate a modified pixel of the high resolution image based on determining that the first difference is higher than or equal to a threshold value, wherein a second difference between the modified pixel and the second sample is smaller than the first difference, wherein modifying the first pixel comprises replacing the first pixel with the second sample.

13. The computing system of claim 12, wherein the operations further comprise:
    maintaining the first pixel and not generating the modified pixel based on determining that the first difference is lower than the threshold value.

14. The computing system of claim 12, wherein the operations further comprise:
    calculating a first luminance value of the first pixel and a second luminance value of the second sample, wherein the first difference comprises a difference between the first luminance value and the second luminance value.

15. The computing system of claim 14, wherein modifying the first pixel comprises modifying the first luminance value of the first pixel.

16. A non-transitory machine readable medium having instructions thereon for reducing aliasing artifacts in foveated rendering, the instructions executable by one or more processors to perform operations comprising:
    accessing a high resolution image and a low resolution image that corresponds to the high resolution image;
    calculating a first difference between a first pixel of the high resolution image and a second sample associated with the low resolution image, the second sample corresponding to the first pixel; and
    modifying the first pixel to generate a modified pixel of the high resolution image based on determining that the first difference is higher than or equal to a threshold value, wherein a second difference between the modified pixel and the second sample is smaller than the first difference, wherein modifying the first pixel comprises replacing the first pixel with the second sample.

17. The non-transitory machine readable medium of claim 16, wherein the high resolution image is generated for a foveated region containing a gaze point of a user on a display device and wherein the low resolution image corresponds to the foveated region containing the gaze point of the user on the display device.

18. The non-transitory machine readable medium of claim 17, wherein the first pixel of the high resolution image and the second sample of the low resolution image correspond to a same point in the foveated region.

19. The non-transitory machine readable medium of claim 16, wherein the second sample associated with the low resolution image is generated by interpolating two or more pixels of the low resolution image.

* * * * *